L. HUIBREGTSE.
HOLDBACK FOR VEHICLES.
APPLICATION FILED JAN. 9, 1917.
1,265,783.
Patented May 14, 1918.
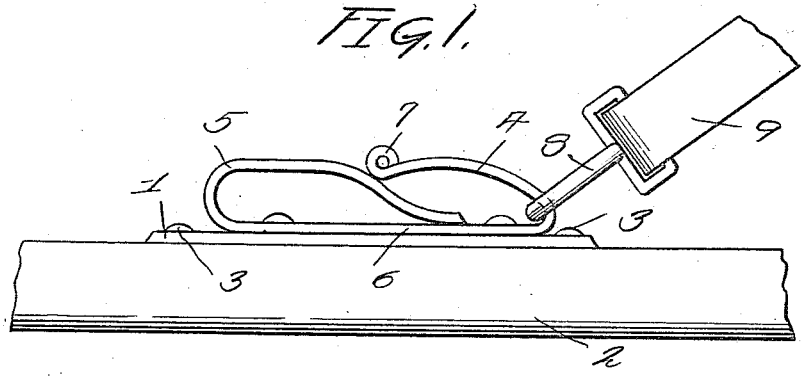
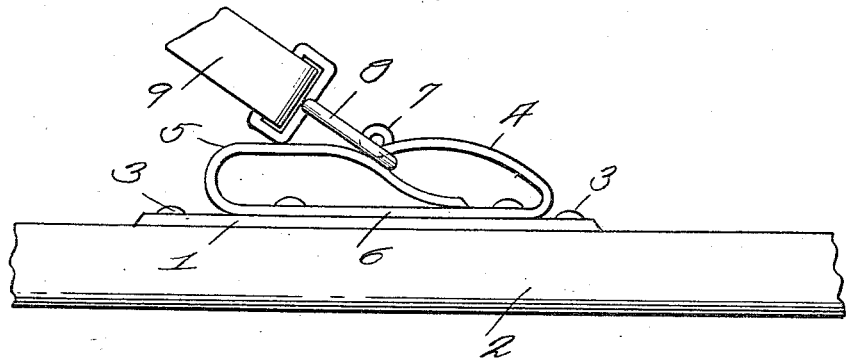
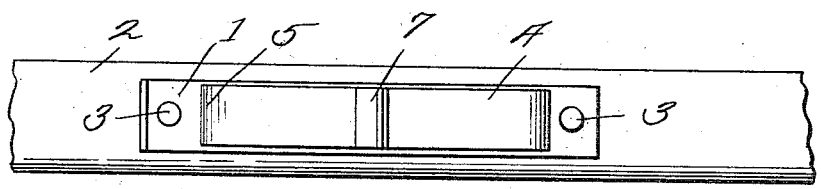
Inventor
L. Huibregtse

UNITED STATES PATENT OFFICE.

LAWRENCE HUIBREGTSE, OF GALIEN, MICHIGAN.

HOLDBACK FOR VEHICLES.

1,265,783.  Specification of Letters Patent.  Patented May 14, 1918.

Application filed January 9, 1917. Serial No. 141,417.

*To all whom it may concern:*

Be it known that I, LAWRENCE HUIBREGTSE, a citizen of the United States, residing at Galien, in the county of Berrien, State of Michigan, have invented certain new and useful Improvements in Holdbacks for Vehicles; and I do hereby declare the following to be a full, clear, and exact description of the invention, such as will enable others skilled in the art to which it appertains to make and use the same.

This invention relates to hold-backs for vehicles, and has particular reference to a holdback which automatically releases the holdback strap when the horse is unhitched from a vehicle.

The invention has for its object to provide a hold-back for use in connection with the hold-back strap of a harness, the hold-back being constructed to permit the straps to be automatically released from the vehicle when the horse is unhitched. It frequently happens upon unhitching a horse from a vehicle that the hold-back straps are not detached from the shafts, with the result that the vehicle is dragged and the harness frequently injured. By the use of my improvement, it is not necessary to pay any attention to the hold-back straps since after the tugs are released from the evener, the hold-back straps which remain secured to the breeching of the harness are brought out with the latter and are automatically released from the holdbacks as the horse leaves the vehicle.

With the above and other objects in view, as will hereinafter appear, my invention will now be fully set forth and described, reference being had to the accompanying drawings.

In the drawings,

Figure 1 is a side elevation of the device, showing the hold-back strap engaged in the hold-back as when the horse is hitched to a vehicle, Fig. 2 is a side elevation, showing the device with the hold-back strap about to be released, and Fig. 3 is a plan view.

Referring more particularly to said drawings, 1 represents a base plate which is adapted to be secured to the shaft 2 as by bolts 3. While it is preferable to construct a device with the base plate 1, it is obvious that the latter may be eliminated so that the hold-back elements are mounted directly upon the shafts instead of through the medium of the base plate 1.

Supported upon the base plate 1 and secured thereto in any suitable manner as by riveting or welding, is the continuous metallic strip which is formed of spring metal, said continuous strip providing a hook 4 and a spring retainer 5. In shaping the continuous metallic strip, an elongated base element 6 is provided which is secured directly upon the base plate 1. At its rear end the base element 6 is bent upwardly and forwardly to provide the hook 4, the free end of the hook 4 being rolled, as at 7 to provide a rounded lip. The opposite or forward end of the base element 6 is turned upwardly and rearwardly to provide the spring retainer 5, the free end of the spring retainer 5 being bent below the rolled free end or lip 7 and coöperating therewith to hold the hold-back ring in position. From the lip 7, the free end of the spring retainer 5 is inclined downwardly and inwardly until its extremity lies in substantially flat contact with the base element 6. In this manner a spring closed hook is provided for the hold-back ring 8, said hold-back ring being of any suitable construction, but in the present embodiment consisting of a double looped ring, one element of which is adapted to be engaged with the hook 4 while the other end is properly secured to the holdback strap 9.

In the operation of the different devices, it is obvious that when the hold-back straps are to be attached to the shafts, the ring 8 is introduced between the lip 7 and the spring retainer 5, and when the tugs are hitched to the evener, the hold-back straps are stretched between the hook 4 and the breeching of the harness. When the horse is unhitched, the tugs are released from the evener, but no attention need be paid to the hold-back straps, since as shown in Fig. 2, as soon as the harness has passed far enough out of the shafts to bring the hold-back straps in front of the hooks 4, the ring 8 will be turned in the position indicated and will then be easily pulled out from between the lip 7 and the spring retainer 5. From the foregoing, it will be evident that I have provided a very simple but practical hold-back which while providing fully adequate means for retaining the hold-back when the horse is hitched, permits the instant release of the hold-back straps from the shafts when the horse is unhitched, when, either through design or neglect the hold-back straps are not first manually released.

What I claim is:—

A holdback comprising a resilient metallic strip having a flat attaching portion between its ends and having one end portion bent upwardly and over the attaching portion in spaced relation thereto to form a hook, the opposite end portion of the strip being bent upwardly and over the attaching portion in spaced relation thereto and extending to and engaging the bill of the hook, said second end portion having its free extremity directed from the bill of the hook diagonally toward and into engagement with the attaching portion within the inclosure of the hook.

In testimony whereof, I affix my signature, in the presence of two witnesses.

LOU HUIBREGTSE.

Witnesses:
WARREN HAGLEY,
ASA SMITH.

Copies of this patent may be obtained for five cents each, by addressing the "Commissioner of Patents, Washington, D. C."